US006345546B1

(12) United States Patent
Houze

(10) Patent No.: US 6,345,546 B1
(45) Date of Patent: Feb. 12, 2002

(54) DEVICE FOR THE AUTOMATIC CONTROL OF THE VIBRATION FREQUENCY AND/OR AMPLITUDES OF A VARIABLE-MOMENT VIBRATOR

(75) Inventor: Christian Houze, Paris (FR)

(73) Assignee: PTC (FR)

( * ) Notice: Subject to any disclaimer, the term of this patent is extended or adjusted under 35 U.S.C. 154(b) by 0 days.

(21) Appl. No.: 09/219,463

(22) Filed: Dec. 23, 1998

(30) Foreign Application Priority Data

Dec. 24, 1997 (FR) ............................................ 97 16753

(51) Int. Cl.[7] .......................... F16H 33/00; E02D 3/074

(52) U.S. Cl. ............................. 74/61; 173/27; 405/271; 364/505

(58) Field of Search ............................... 74/61; 173/27; 405/271; 364/505

(56) References Cited

U.S. PATENT DOCUMENTS 4,546,425 A 10/1985 Breitholtz
5,177,386 A * 1/1993 Shimada .................... 74/61 X
5,253,542 A 10/1993 Houze
5,410,879 A * 5/1995 Houze ........................ 74/61 X
5,695,298 A 12/1997 Sandstroem
5,725,329 A * 3/1998 Chelminski ................. 405/232
5,825,663 A * 10/1998 Barba et al. ................ 74/61 X

* cited by examiner

*Primary Examiner*—Allan D. Herrmann
(74) *Attorney, Agent, or Firm*—William A. Drucker

(57) ABSTRACT

The device embodying the invention applies to a variable-moment vibrator comprising at least two trains of eccentrics driven in rotation by a variable-speed motorization, the variation of the vibratory moment being obtained by a phase shifter which generates a phase shift between the rotary motion of the two trains of eccentrics. It comprises at least one accelerometric detector subjected to the vibrations generated by the vibrator, a means for deducing, from the accelerometric data detected, a value representative of the harmfulness of the vibrations, a means for entering a set value and a processor which acts on the phase-shift control of the phase shifter and/or on the component controlling the motorization speed variation in order to maintain the value representing the harmfulness of the vibrations at a level equal to or lower than the set value.

9 Claims, 2 Drawing Sheets

DEVICE FOR THE AUTOMATIC CONTROL OF THE VIBRATION FREQUENCY AND/OR AMPLITUDES OF A VARIABLE-MOMENT VIBRATOR

BACKGROUND OF THE INVENTION

1. Field of the Invention

This invention relates to a device for the automatic control of the vibration frequency and/or amplitudes of a variable-moment vibrator.

2. Description of the Prior Art

The very principle of vibratory pile driving is known to consist in making the ground vibrate by means of the object to be driven in. In particular, in soils of low consistency, the ground becomes fluidized thus enabling the profile to be driven into the ground by way of its own weight combined with that of the vibrator working above it.

Usually, vibrators used for pile driving use at least two trains of eccentric feeders mounted rotatably about shafts integral with two respective pinions meshing with one another so as to rotate in opposite directions to one another, under the effect of a motorization which can comprise one or more motors.

The variation of the vibratory moment generated by the two trains of feeders is obtained by means of a phase shifter capable of generating a variable angular phase shift between the rotary motions of the two feeder trains.

It so happens that vibrations propagate from the place of pile driving and the intensity of these vibrations can be harmful to neighboring buildings, especially to masonry work with little bonding or to premises housing equipment that is sensitive to vibrations, such as measuring instruments and/or computers.

OBJECT OF THE INVENTION

The main object of this invention is to remedy the preceding disadvantages, particularly to permanently control the amplitude of vibrations in order to remain below a threshold of vibration-induced harmfulness, this threshold being variable as a function of the type of ground, of the objects to be driven in, and of the installations to be protected. It notes that according physical laws, the harmfulness of the vibrator for the vibrations emissions, depends on the emitted vibratory energy and therefore of the amplitude product by the frequency.

SUMMARY OF THE INVENTION

Accordingly, there is provided an automatic control device using at least one accelerometric detecter positioned so as to be directly or indirectly subjected to the vibrations generated by the vibrator, a means for deducing a value representing the harmfulness of the vibrations on the basis of the accelerometric data provided by the accelerometric detector, a means for entering a set value, and an electronic processing means associated with an actuating means acting on the phase-shift control of motorization speed variation control and therefore on the vibrations frequency and/or of the phase shifter in order to maintain the value representing the harmfulness of the vibrations at a level equal to or lower than the set value.

By way of these arrangements, subsequent to a few on-site trials conducted beforehand, the operator can determine a set value which, once it has been entered, will ensure the generation of a vibration of sufficient amplitude for driving into the ground but which will remain below the threshold of harmfulness pertaining to sensitive installations in the vicinity. In the same way, these tests will permit to determinate and to memorize a harmfulness/amplitude law, said law being used by the device for the automatic control to set the vibrations amplitude and/or frequency in order to maintain the harmfulness of the vibrations at a level equal to or lower than the set value.

Advantageously, the accelerometric detector is positioned on the vibrating shell of the vibrator. In this case, this detector can be linked to the electronic processing means via a wire connection.

However, the invention is not limited to this solution. In fact, the device embodying the invention can use an accelerometric station fitted with an electronic processing means and to be installed on the structure to be protected. In this case, the transmission between the accelerometric station and the electronic processing circuits can be carried out by any remote transmission means such as a wire connection, radio, etc.

BRIEF DESCRIPTION OF THE DRAWINGS

Further features and advantages of the invention will be apparent from embodiments of the invention described, by way of non-limiting examples, in reference to the corresponding accompanying drawings in which.

DESCRIPTION OF THE PREFERRED EMBODIMENTS

Figure 1:
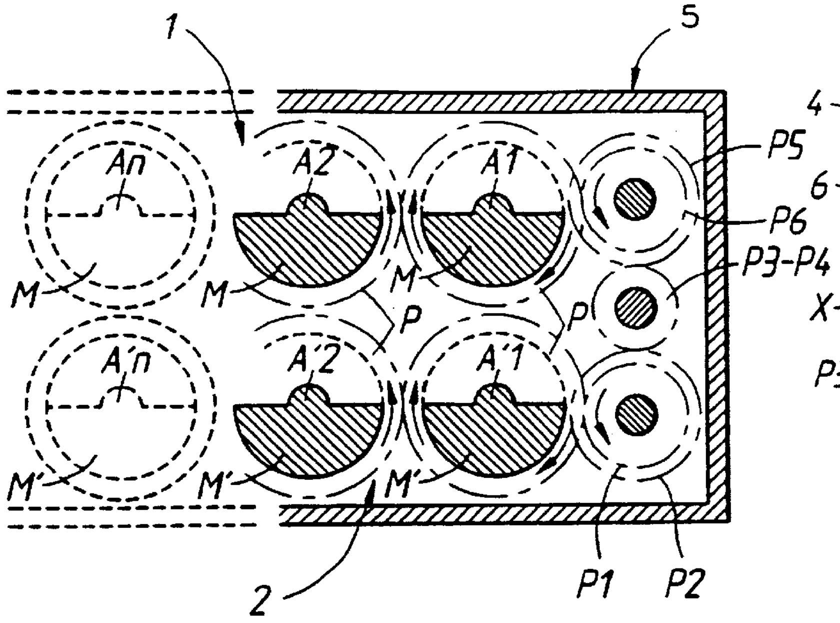
FIGS. 1 and 2 are two schematic sectional views, respectively an axial and a transversal sectional view, of a variable-moment vibrator.
Figure 2:
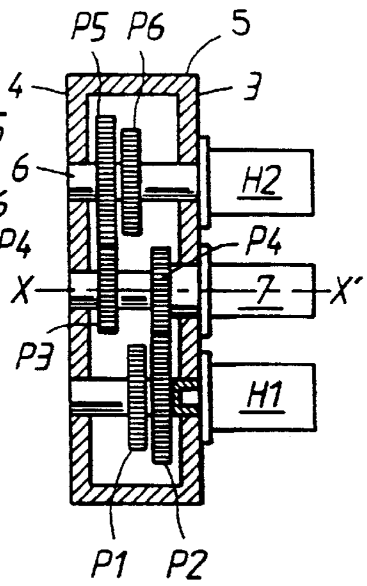

In the example represented in FIGS. 1 and 2, the vibrator comprises two trains 1, 2 of eccentric feeders mounted rotatably by means of shafts $A_1$, $A_2$, $A_n$, $A'_1$, $A'_2$, $A'_n$, parallel to a transversal axis XX' and of which the ends fit into bearings borne by two parallel flanges 3, 4 constituting the two lateral sides of a housing 5.

With each of these feeders M, M' is associated a pinion P arranged and dimensioned so that the pinions P associated with a same train 1, 2 of feeders M, M' mesh with one another, in successive couples.

FIG. 1 shows two trains 1, 2 of feeders M, M' each comprising a couple of feeder M, M'—pinion P sets represented in unbroken lines, the set represented partially in broken lines indicating the layout of another couple.

The two trains 1, 2 of feeders M, M' are rotatably driven by means of a variable-speed motorization comprising two hydraulic motors $H_1$, $H_2$ mounted on the flange 3 at one of the ends of the housing 5.

These two motors $H_1$, $H_2$ drive two respective parallel output shafts passing through bearings integral with the flanges 3, 4 and each bearing two coaxial pinions $P_1$, $P_2$—$P_5$, $P_6$.

The pinion $P_1$ meshes with the pinion P integral with the feeder M' in order to rotatably drive the train 2.

The pinion $P_6$ meshes with the pinion P integral with the feeder M in order to rotatably drive the train 1.

In order to generate a variation in the amplitude of the vibratory moment, the vibrator further comprises a hydraulically controlled phase shifter 7 comprising:

an input shaft bearing a pinion $P_3$ meshing with a pinion $P_5$ integral with the output shaft of the motor $H_2$, and an output shaft bearing a pinion $P_4$ meshing with a pinion $P_2$ integral with the output shaft of the motor $H_1$.

This invention is not, of course, limited to this arrangement: the pinion $P_3$ could e.g. mesh with any one of the pinions P associated with the feeders M of the train 1, whereas the pinion $P_4$ could mesh with any one of the pinions P associated with the feeders M' of the train 2.

Figure 3:
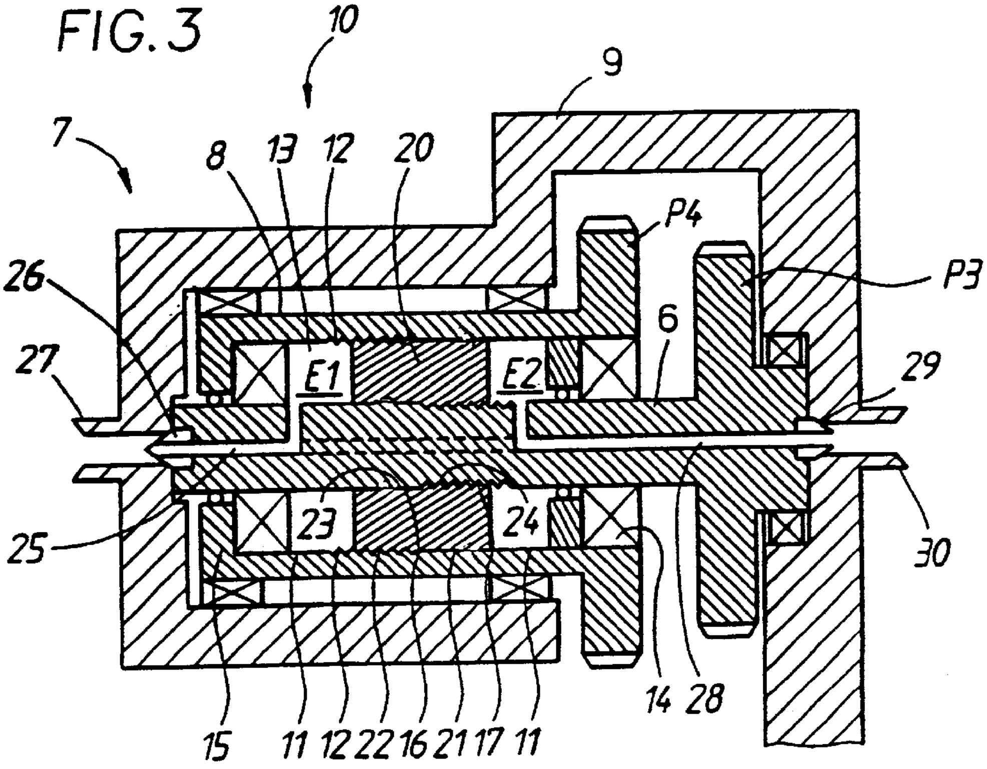
FIG. 3 is a schematic axial section illustrating the general principle of a phase shifter.
Figure 4:
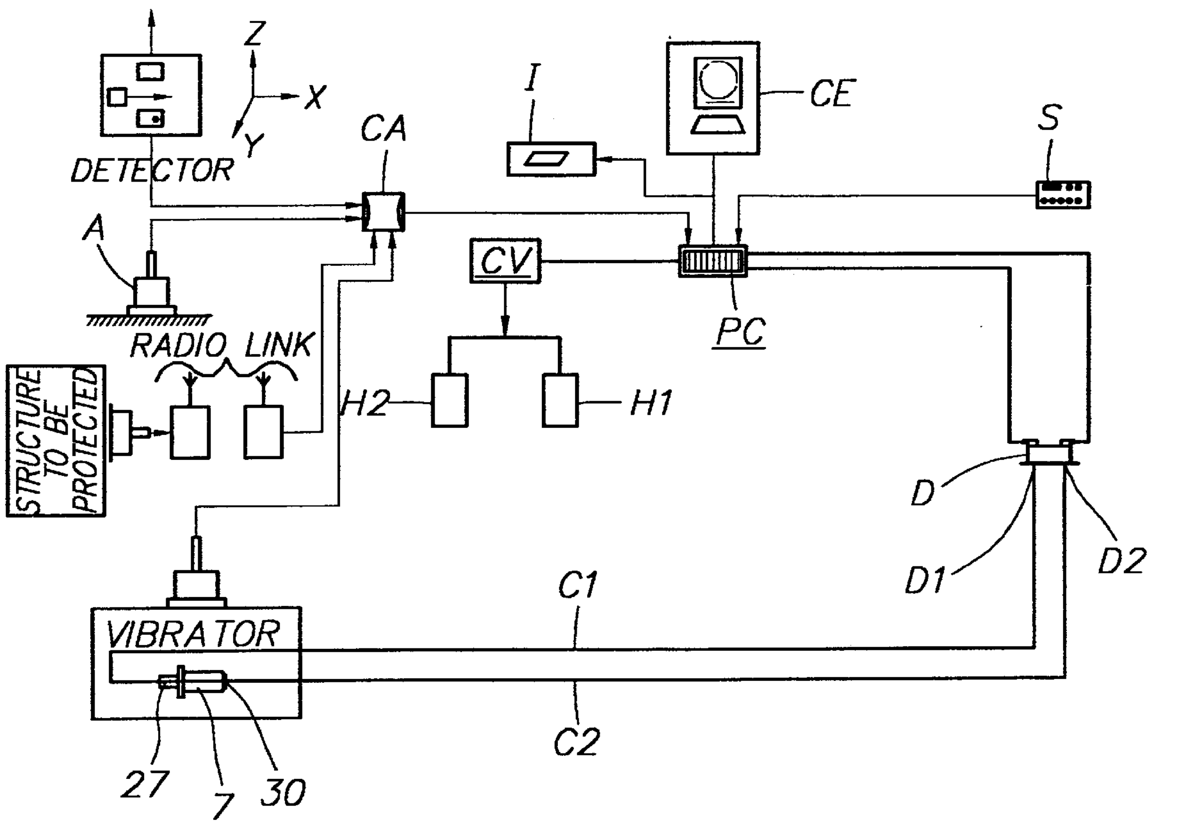
FIG. 4 is a skeleton diagram of the automatic control circuit of the phase shifter.

As represented in FIG. 3, the phase shifter 7 is composed of a partly cylindrical fixed structure 9 which is integral with the flanges 3, 4.

Inside this structure 9 are rotatably mounted two coaxial shafts, namely:

a shouldered central shaft (input shaft 6) bearing the pinion $P_3$ at its end adjacent to the flange 4, a tubular shaft (output shaft 8) mounted rotatably about the shouldered shaft 6 and bearing the pinion $P_4$ axially shifted in relation to the pinion $P_3$.

At the level of the cylindrical part 10 of the structure 9, the tubular shaft 8 comprises a cylindrical inner surface successively with a smooth portion 11 and a tapped portion 12 with helical gearing.

This cylindrical inner surface delimits, along with a cylindrical surface of the shouldered shaft, an annular space 13 closed off, on one side, by a bearing 14 ensuring the rotational and tight mounting of one of the two shafts 6, 8 in relation to the other, and, on the other side, by a bottom 15 integral with the shaft 8 via which the shaft 6 passes while preserving tightness.

The cylindrical surface of the shaft 6 successively comprises a smooth portion 16 and a threaded portion 17 with helical gearing.

Inside the annular space 13 is arranged an annular piston 20 comprising:

a cylindrical outer surface comprising a smooth portion 21 which slides, while preserving tightness, on the smooth portion 11, and a threaded portion 22 which meshes with the tapped portion 12;

a cylindrical inner surface comprising a smooth portion 23 which slides, while preserving tightness, over the smooth portion of the shaft 6, and a tapped portion 24 whose helical teeth mesh with the teeth of the threaded portion 17.

The space $E_1$ included between the piston 20, the bottom 15 and the two shafts 6, 8 constitutes a first working chamber (main working chamber) into which a hydraulic fluid can be introduced by way of an axial channel 25 made in the shaft 6.

This axial channel 25 opens out into a rotor seal 26 provided at the end of the shaft 6 and of which the fixed part is integral with the structure 9. This fixed part includes a connection sleeve 27 to which the conduit of a hydraulic control circuit of the phase shifter can be connected.

Likewise, the space $E_2$ included between the piston 20, the bearing 14 and the two shafts 6, 8, constitutes a second working chamber into which hydraulic fluid can be introduced via an axial channel 28 made in the shaft 6.

This channel leads to a rotor seal 29 provided at the end of the shaft 6 and of which the fixed part, which is integral with the structure 9, constitutes a connection sleeve 30.

This phase shifter operates as follows:

When there is no pressure inside the working chambers space $E_1$ and $E_2$, the torque/moment* rotating the train 1 of feeders M brings about a dual screwing phenomenon between the piston 20 and the shafts 6, 8. This screwing then causes axial displacement of the piston 20 until it abuts, at the end of its stroke, against the bottom 15.

In this position, the feeders M of the two feeder trains 1, 2 rotate in opposite phase and the resultant moment thereof is zero.

When pressurized fluid is injected into the working chamber $E_1$, this piston 20 is subjected to axial stress which tends to move it away from the bottom 15 and therefore to generate a relative double rotation between the two shafts 6, 8, this being achieved by way of the combined action of the threadings 17, 22 with the tappings 12, 24. Of course, the latter are designed so as to bring about a relative double rotation of the shafts 6, 8 of up to 180° (putting the feeders M back in phase).

It is obvious that this relative rotation only takes place if the motor torque increment, resulting from the admission of pressurized hydraulic fluid into the chamber $E_1$, exceeds the load moment that the object subjected to vibrations opposes to the vibrator (resistance to pile driving).

According to the invention, the admission of hydraulic fluid into the chambers $E_1$, $E_2$ is controlled by an automatic control using:

a hydraulic distributor D whose two outputs are respectively connected, via two respective hydraulic circuits $C_1$, $C_2$, to the inputs of the two rotor seals 27, 30 of the phase shifter 7;

an accelerometric detector A associated with a conditioner CA whose purpose it is to process and digitize accelerometric data supplied by the detector A;

a display S capable of entering and displaying a set value, a processor PC which can consist of a programmable logic controller which determines the variance between the data supplied by the conditioner and the set value entered into the display unit S, and which controls the distributor D and therefore the phase shift performed by the phase shifter 7, so as to cancel out said variance.

The processor PC can, of course, be fitted with various usual peripherals such as a keyboard/screen console CE, a printer I, etc.

As mentioned above, the accelerometric detector A can be positioned on the vibrator housing, with its sensitive axis parallel to the axis of propagation of the vibrations from the vibrator. In this case, the conditioner CA carries out double integration of the sine signal emitted by the accelerometric sensor A, as well as analog-to-digital conversion of this signal. The signal transmitted to the processor PC is then a signal that is representative of the amplitude of the vibrations generated by the vibrator.

The set value that the operator will have to display on the display unit S will therefore be a value representative of an amplitude of these pile driving vibrations. This value can be determined after an exploratory phase so that it corresponds to an amplitude that is sufficient to ensure the pile driving yet below a threshold of harmfulness for sensitive surrounding installations.

As a function of the set value selected, the processor PC controls the distributor D, usually a hydraulic slide valve, so as to set the rotation of the phase shifter to one or other direction (the phase shifter rotates at the speed of the eccentric feeders of the vibrator).

This device does not offer the possibility of manual control currently available on variable-moment vibrators which are usually not very precise and which, in order to achieve a comparable result, would require constant manipulation on the part of the operator as well as passive reading of the amplitude in order to constantly adjust the amplitude to the required value.

Furthermore, this solution overcomes the defectiveness of the rotor seals used to supply the phase shifter 7 with hydraulic fluid: indeed, these seals are not tight and are therefore fitted with drains. They do not therefore enable a given phase-shift value to be maintained without regular and frequent corrections.

By automating phase shift control, all these drawbacks are remedied. Moreover, automation makes it possible to compensate the amplitude variation associated with the variation in the nature of the soil driven through.

According to another embodiment, the accelerometric detector A can comprise one or more accelerometric sensors (e.g. a set of three sensors angled according to three orthogonal axes) positioned on the structure to be protected against vibrations, in order to enable the measurement, in one or more directions, of the amplitude of the vibrations to which said structure is subjected.

Similarly, the accelerometric signal supplied by each of the accelerometers of the detector undergoes, in the conditioner CA, a transformation, a double integration and an analog-to-digital conversion. The signal at output of the conditioner CA, which is representative of the particle speed* of the soil, is applied to an input of the processor PC. The latter can then process the accelerometric data in order to deduce a value indicating the harmfulness of the particle speed detected. This value can e.g. correspond to at all times to the biggest accelerometric signal of all the signals put out by all the accelerometric sensors. In the same way, this processor can determinate, according received parameters, a harmfulness law according the motors speed and/or the vibration amplitudes.

This value indicating the harmfulness of the particule speed is compared, by the processor PC, to a value representative of a threshold of harmfulness which is determined and entered by the operator. The processor then can acts according the aforesaid law on the hydraulic distributor D with a view to increasing or decreasing the amplitude of the vibrations emitted by the vibrator and/or on the speed variation control CV of the motors $H_1$ et $H_2$ so as to bring the value indicating harmfulness back into line with a value not exceeding the harmfulness threshold value.

Given the possibly considerable distance separating the vibrator and the location of the accelerometric detector A, the link between this detector, which may be associated with the conditioner, and the processor, can be established by means of a remote transmission device such as a cable or radio link.

In fact, in the processor PC is displayed the acceleration value or the maximum authorised particle speed for the structure to be protected and the processor is programmed to pilot the vibrator, no longer in relation to a set value of the same type but in relation to the impact of the vibration measured on the installation proper constituting the target, in relation to the maximum authorised value for this target.

The device embodying the invention can, of course, comprise plural accelerometric detectors respectively installed on several installations or targets. In this case, the processor will set the amplitude of the vibrator on the basis of the most demanding of the targets to be protected.

What is claimed is:

1. Device for automatic control of the amplitude of the vibrations of a variable-moment vibrator used to drive objects into the ground, said vibrator comprising at least two trains of eccentric feeders each comprising at least two eccentric feeders mounted rotatably about shafts integral with two respective pinions meshing with one another so as to rotate in opposite directions to one another, under the effect of a motorization which comprises one or more motors a variation of the vibratory moment generated by the two trains of feeders being obtained by means of a phase shifter capable of generating a variable angular phase shift between the rotary motions of the two trains of feeders, wherein said device further comprises at least one accelerometric detector positioned so as to be subjected to the vibrations generated by the vibrator, a means for deducing a value representing the harmfulness of the vibrations on the basis of the accelerometric data provided by the accelerometric detector, a means for entering a set value, and an electronic processing means associated with an actuating means acting on the phase-shift control of the phase and/or a motorization speed variation control in order to maintain the value representing the harmfulness of the vibrations at a level equal to or lower than the set value.

2. Device as claimed in claim 1, wherein the set value results from on-site trials conducted beforehand.

3. Device as claimed in claim 1, wherein the aforesaid electronic processing means are conceived in order to determinate on-site trials conducted beforehand, a harmfulness/amplitude law of the vibrations frequency, said law being used by the device for the automatic control to set the vibrations amplitude and/or frequency in order to maintain the harmfulness of the vibrations at a level equal to or lower than the set value.

4. Device as claimed in claim 1, wherein that the accelerometric detector comprises an accelerometer positioned on the vibrating housing of the vibrator.

5. Device as claimed in claim 1, wherein the accelerometric detector is installed on a structure to be protected.

6. Device as claimed in claim 5, wherein the transmission between the accelerometric detector and the electronic processing means is performed by any known remote transmission means such as a wire connection or radio link.

7. Device as claimed in claim 6, wherein the accelerometric detector comprises three accelerometric sensors angles according to three orthogonal axes.

8. Device as claimed in claim 7, wherein, at all times, the electronic processing means takes into consideration the most important accelerometric signal of all the signals put out by the accelerometric sensors.

9. Device as claimed in claim 5, wherein which comprises plural accelerometric detectors respectively installed on several installations or targets, with the electronic processing means then setting the amplitude and/or the frequency of the vibrator in relation to the most demanding of the targets to be protected.

* * * * *